3,277,117
METHOD FOR PREPARATION OF ANHYDRO DERIVATIVES OF TRIMELLITIC ANHYDRIDE

Richard E. Van Strien, Griffith, and Benjamin A. Bolton, Gary, Ind., assignors to Standard Oil Company, Chicago, Ill., a corporation of Indiana
No Drawing. Filed Dec. 18, 1963, Ser. No. 331,371
5 Claims. (Cl. 260—346.3)

This invention relates to the preparation of bis-anhydrides of trimellitic anhydride, the anhydride of trimellitic acid, having the formula

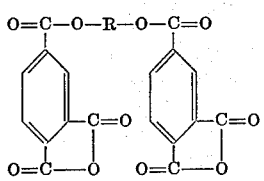

wherein R is a radical of the group consisting of a divalent $C_{2-12}$ alkylene radical, phenylene and

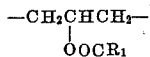

wherein $R_1$ is $C_{1-3}$ alkyl.

The above bis-anhydrides of trimellitic anhydride are useful for any purpose wherein an anhydride group is desirable. These compounds are particularly useful in the preparation of poly-amides, poly-imides, poly-esters, etc. In the preparation of high molecular weight poly-amides it is essential that the bis-anhydride reactant be of high purity.

A method for the preparation of these bis-anhydrides comprises reacting about 2 moles of trimellitic anhydride with about 1 mole of an ester having the formula $R_1COOROOCR_1$, wherein R and $R_1$ are as described above, at a temperature of from about 175 to about 300° C. This method involves the trans-acidolysis reaction of trimellitic anhydride through the 4-position carboxyl group of the anhydride with the acid residue portions of the esters.

Trimellitic anhydride is an extremely hygroscopic compound. Consequently, the anhydride group is easily hydrolyzable to carboxyl groups. It has been found that if the trimellitic anhydride has an anhydride content less than 99 percent or if the aforesaid trans-acidolysis reaction is not conducted under anhydrous conditions, the aforesaid method forms reaction mixtures from which it is extremely difficult to separate simply and economically substantially pure crystalline bis-anhydrides. Therefore, a simple economical and commercially practical manufacturing process that does not require reactant purity or anhydrous reaction conditions is desired for the preparation of the above bis-anhydrides of trimellitic anhydride.

It has been discovered that when the trans-acidolysis reactants are reacted in the presence of from about 5 to about 50 weight percent, based on the ester, of an anhydride of a $C_{2-4}$ alkanoic acid that substantially pure crystalline bis-anhydrides of trimellitic anhydride are easily separated from the resultant reaction mixture.

The $C_{2-4}$ alkanoic acid anhydrides are acetic anhydride, propionic anhydride and butyric anhydride. It is preferable that the anhydride be of the same acid as used to form the ester reactant inasmuch as alkanoic acid is a by-product of the process. Acetic anhydride is preferred.

The above described ester reactants can be the acetic acid, propionic acid, or butyric acid diesters of terminal $C_{2-12}$ alkanediols or dihydroxy benzenes, or triesters of glycerin. The alkanediols are ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-hendecanediol, and 1,12-dodecanediol. The dihydroxy benzenes are catechol, resorcinol and hydroquinone.

The following examples are illustrative embodiments of the improved method in accordance with the present invention for preparing the herein-described bis-anhydrides of trimellitic anhydride:

Example I

Acetic anhydride, 224 g. (2.2 moles) and ethylene glycol, 62 g. (1.0 mole) were charged to a 2000 ml. glass resin reaction kettle equipped with a stirrer, inert gas sparge, thermometer, and vigreux distillation column. The contents were heated with stirring to a temperature of 138° C. to 171° C. A reaction time of 5–6 hours in this temperature range resulted in the distillation of 114 g. (120 g. theory) of acetic acid from the reaction zone. The temperature at the top of the distillation column was maintained near the boiling point of glacial acetic acid (116° C.). The acetic acid distilled had a refractive index of 1.3702 (glacial acetic acid=1.3715/22.9).

At this point, 384 g. (2.0 moles) of TMA was charged to the reaction zone. The temperature was raised to 199° C. at which point acetic acid again started distilling over. The temperature was gradually raised to 266° C. over a 6 hour period to remove a total of 225 g. of acetic acid during the entire run (240 g. theory).

The crude bis-anhydride product having the above formula wherein R is —$CH_2CH_2$— had an acid number of 576 (theory=546), a melting point of 159° C., and an anhydride content of 100%.

A portion of the product (20 g.) was heated in dry boiling methylethyl ketone (40 g.) for several minutes, the solution was allowed to cool slowly and a white precipitate formed. The precipitate was filtered and dried (15.1 g.=75% yield). It had an acid number of 540 and an anhydride content of 99% and melted sharply at 172° C.

Example II

Ethylene glycol, 62 g. (1.0 mole), acetic anhydride, 224 g. (2.2 mole) and TMA 384 g. (2.0 mole) were charged to the same equipment described in Example I. At a temperature of 152° C., acetic acid started distilling overhead. The temperature was raised slowly to 260° C. over a 7 hour period to remove 235 g. of acetic acid (240 theory).

The crude product had an acid number of 544 and an anhydride content of 93%. The purified product, recrystallized from methylethyl ketone, was obtained in 69% net yield and was a white product with a 530 acid number, an anhydride content of 100% and a melting point of 171° C.

Example III

Ethylene glycol diacetate, 292 g. (2 mol), and 23 g. acetic anhydride (ca. 8 wt. percent based on the diester) were charged to the same equipment described in Example I. The charge was heated to 145° C. in 45 minutes. At this point, 768 g. (4 mol) of trimellitic anhydride was charged to the reaction mixture. The resultant mixture was then heated to 266° C. over a two hour period with continuous evolution of acetic acid. A total of 226 g. of acetic acid was collected. The crude product had an acid number of 558, a melting point of 161° C. and an anhydride content of 96%. A 70 wt. percent yield of purified product was obtained upon recrystallization from methylethyl ketone.

Example IV

Ethylene glycol diacetate, 12.9# (0.08 mol), and 33# (0.17 mol) trimellitic anhydride were charged to the reaction zone and heated. At 193° C., acetic acid began evolving. The charge was further heated to 243° C. and held for 12 hours at that temperature with continuous evolution of acetic acid. A total of 4300 ml. of acetic acid was collected. The crude reaction product had a melting point of 157° C. and an anhydride content of 91%. The crude product could not be recrystallized from methylethyl ketone in the manner described in Example I.

When the herein-described bis-anhydrides of trimellitic anhydride are prepared in accordance with the present invention, a separate preparation of the esters and purification thereof is not required prior to reaction with trimellitic anhydride. Example I illustrates the preparation of the diester—ethylene glycol diacetate—in the presence of excess acetic anhydride and then without isolation of the diester, it is reacted with trimellitic anhydride by transacidolysis in the presence of acetic anhydride to form the desired bis-anhydride which can be recrystallized from the reaction mixture. Example II illustrates the mode of preparation wherein all of the reactants are charged initially and then with continued heating to the transacidolysis reaction temperature, the desired bis-anhydride is produced. Example III illustrates that the separately prepared diacetate can be simply and easily reacted with trimellitic anhydride in the presence of acetic anhydride to give the desired bis-anhydride which is recrystallizable; whereas in the absence of acetic anhydride, Example IV, the resultant reaction product is not recrystallizable.

It will be apparent to one skilled in the art that the present invention provides a simple and effective improved method for the preparation of the herein described bis-anhydrides, which anhydrides are obtainable in crystalline form of high purity.

We claim:
1. In the method of preparing compounds having the formula

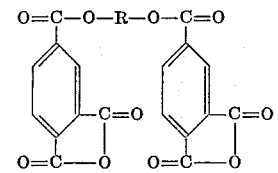

wherein R is a divalent radical of the group consisting of $C_{2-12}$ alkylene, phenylene and

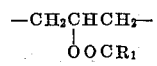

wherein $R_1$ is $C_{1-3}$ alkyl, which comprises reacting about 2 moles of trimellitic anhydride with about 1 mole of an ester having the formula $R_1COOROOCR_1$ wherein R and $R_1$ are as described above at a temperature of from about 175 to about 300° C., the improvement consisting of conducting said reaction in the presence of an anhydride of a $C_{2-4}$ alkanoic acid, the amount of said anhydride being from about 5 to about 50 weight percent based on said ester.

2. The method of claim 1 wherein R is $-CH_2CH_2-$.
3. The method of claim 1 wherein $R_1$ is methyl.
4. The method of claim 1 wherein said anhydride is acetic anhydride.
5. The method of claim 1 wherein R is $-CH_2CH_2-$, $R_1$ is methyl, and said anhydride is acetic anhydride.

References Cited by the Examiner
UNITED STATES PATENTS
3,183,248  5/1965  Hirsch et al. _____ 260—346.3

ALEX MAZEL, *Primary Examiner.*
HENRY R. JILES, *Assistant Examiner.*